United States Patent [19]
Koch, Jr.

[11] 3,886,644
[45] June 3, 1975

[54] UPPER MAIN BEARING REMOVAL TOOL
[75] Inventor: Julius F. Koch, Jr., River Forest, Ill.
[73] Assignee: General Motors Corporation, Detroit, Mich.
[22] Filed: June 19, 1974
[21] Appl. No.: 480,935

[52] U.S. Cl................................. 29/270; 29/256
[51] Int. Cl............................................. B25b 27/14
[58] Field of Search....... 29/256, 270, 282, 149.5 R, 29/427

[56] References Cited
UNITED STATES PATENTS
1,872,600  8/1932  Manning............................. 29/270
2,800,708  7/1957  Coleman............................ 29/275
3,722,057  3/1973  Barnes ......................... 29/149.5 R
FOREIGN PATENTS OR APPLICATIONS
26,451  8/1964  Japan.................................. 29/427

Primary Examiner—Al Lawrence Smith
Assistant Examiner—Harold P. Smith, Jr.
Attorney, Agent, or Firm—Robert M. Sigler

[57] ABSTRACT

A tool for the removal of an upper main bearing shell from an engine with the crankshaft in place comprises a reciprocable member having a tubular portion for mounting on one of the stud bolts flanking the bearing and a pivotable pawl mounted thereon, the pawl extending toward the bearing and biased away from the tubular portion. An arcuate member similar to the bearing in size and shape and having ratchet teeth formed in its outer surface is engaged by the pawl when placed end to end with the upper main bearing shell around the crankshaft journal. The arcuate member combines with the reciprocable member to push the bearing out of the bearing seat as a nut on the stud bolt carrying the reciprocable member is alternately screwed down the bolt and back.

2 Claims, 3 Drawing Figures

UPPER MAIN BEARING REMOVAL TOOL

BACKGROUND OF THE INVENTION

Combustion engines generally contain a power shaft from which useful work can be obtained; and this power shaft is generally rotatably carried in bearings. In particular, piston-type internal combustion engines include crankshafts which are held in bearings called main bearings and distributed along their length.

In the maintenance of such engines, it is often desirable to remove a worn bearing so that a replacement bearing can be inserted. It is particularly desirable to be able to do so without removal of the crankshaft.

The main bearing is generally split into upper and lower shells, and the lower main bearing shell is easily removed with the bearing cap. However, the upper main bearing shell is located between the crankshaft bearing surface and the bearing seat in the engine block and is often frozen or stuck to the bearing seat so that it must be forced out.

The upper main bearing shell generally engages the bearing seat in some way so that it cannot be rotated out of the bearing seat in the direction of crankshaft rotation. However, if the crankshaft journal is equipped with an oil passage, a special tool can be inserted therein to push the upper main bearing out of the bearing seat upon crankshaft rotation opposite to the normal rotation. In many engines, however, some journals contain no such oil passages; and this method cannot be used. For such bearings, such expedient means as a piece of metal and a hammer or a jack braced against some portion of the engine are usually effective but fraught with danger of possible damage to either the user or the engine.

SUMMARY OF THE INVENTION

This invention therefore relates to an improved device for the removal of any upper main bearing shell in a safe, controlled and dependable manner. The device generally comprises a ratchet-and-pawl jack which is mounted on at least one of the stud bolts flanking the bearing and operated by alternately tightening and loosening the nut mounted on that stud bolt. The device is so designed that the user obtains the leverage of the threads in the stud bolt and nut; and the forces are applied against the stud bolt, which is designed to withstand forces far greater than those required to remove a main bearing shell.

The device generally comprises two members: a reciprocable jack member which is mounted on the stud bolt and includes a pivotable pawl; and an arcuate ratchet member which is placed on the crankshaft journal end to end with the upper main bearing shell and includes ratchet teeth on its outer surface. As the nut is alternately screwed down and back on the stud bolt, the pawl engages each of the ratchet teeth in turn and gradually moves the arcuate ratchet member into the bearing seat, thus pushing the main bearing shell out of the bearing seat.

Further details and advantages of this invention will be apparent from the accompanying drawings and following description of a preferred embodiment.

DESCRIPTION OF THE PREFERRED EMBODIMENT

Figure 2:
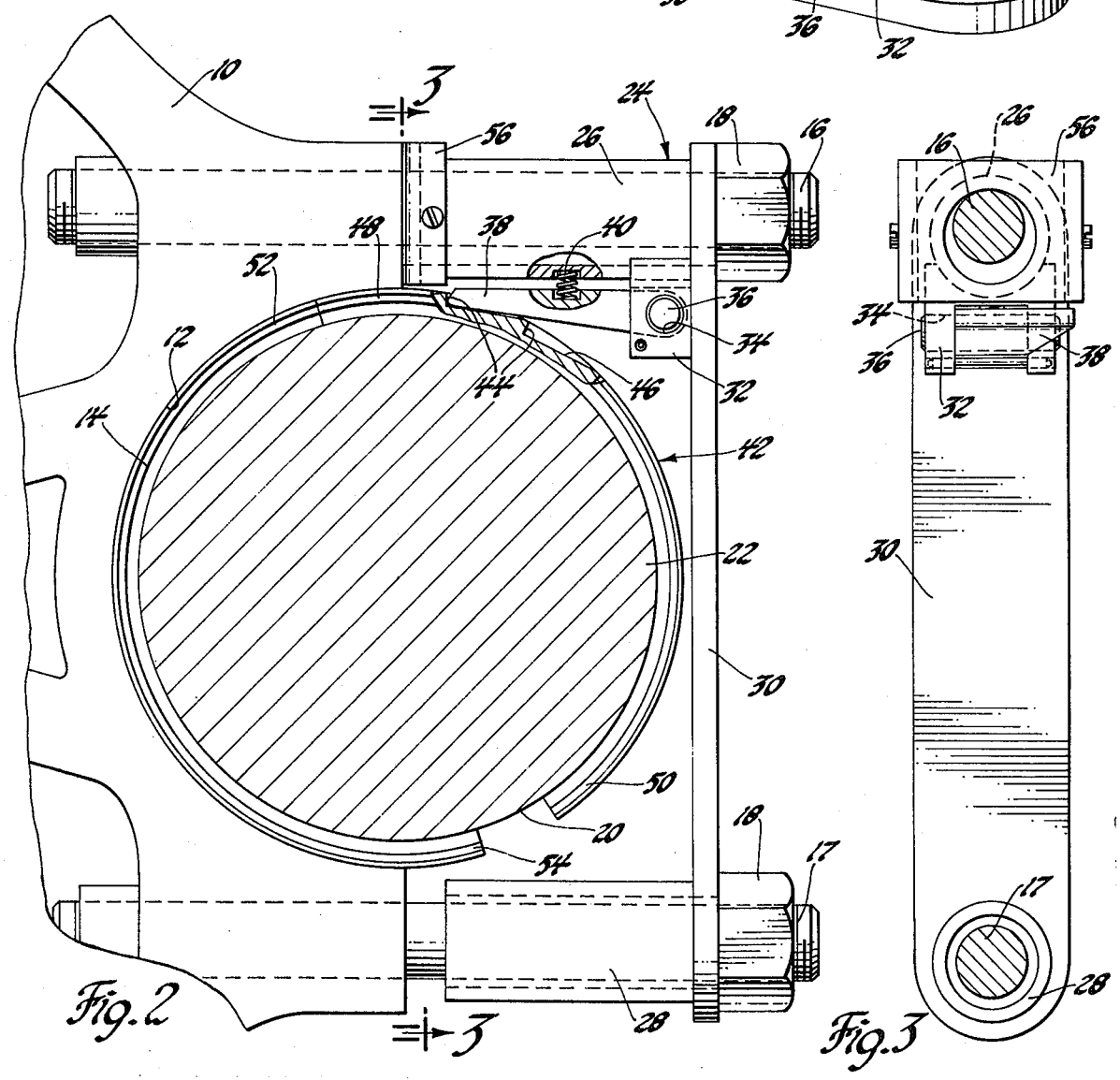
FIG. 2 is a side view of my invention in its environment.

Referring first to FIG. 2, a main bearing support 10 of an internal combustion engine defines a semicircular bearing seat 12. As shown in FIG. 2, the parts of the engine are shown inclined 90° to the left of the normal operating position, as they might be during engine maintenance. Thus, an upper main bearing shell 14 is shown in the bearing seat 12, although it has been pushed part way out of the bearing seat 12 in FIG. 2.

A pair of stud bolts 16 and 17, flanking the bearing seat 12, project outward from the main bearing support 10 to the right in FIG. 2. Each of stud bolts 16 and 17 is held in the main bearing support 10 in the normal manner and carries a threaded nut 18 on its free end. Normally, a bearing cap, not shown, with a lower main bearing shell, also not shown, would fit over stud bolts 16 anf 17 and be fastened securely to the main bearing support 10 by the nuts 18. The upper and lower main bearing shells would together form a bearing for the journal surface 20 of the crankshaft 22 in the standard manner.

In FIG. 2, the main bearing support 10 shown has had its accompanying bearing cap and lower main bearing shell removed, although it is understood that the remaining bearing caps and lower main bearing shells of the engine remain in place to hold the crankshaft 22 in the position shown.

Figure 1:
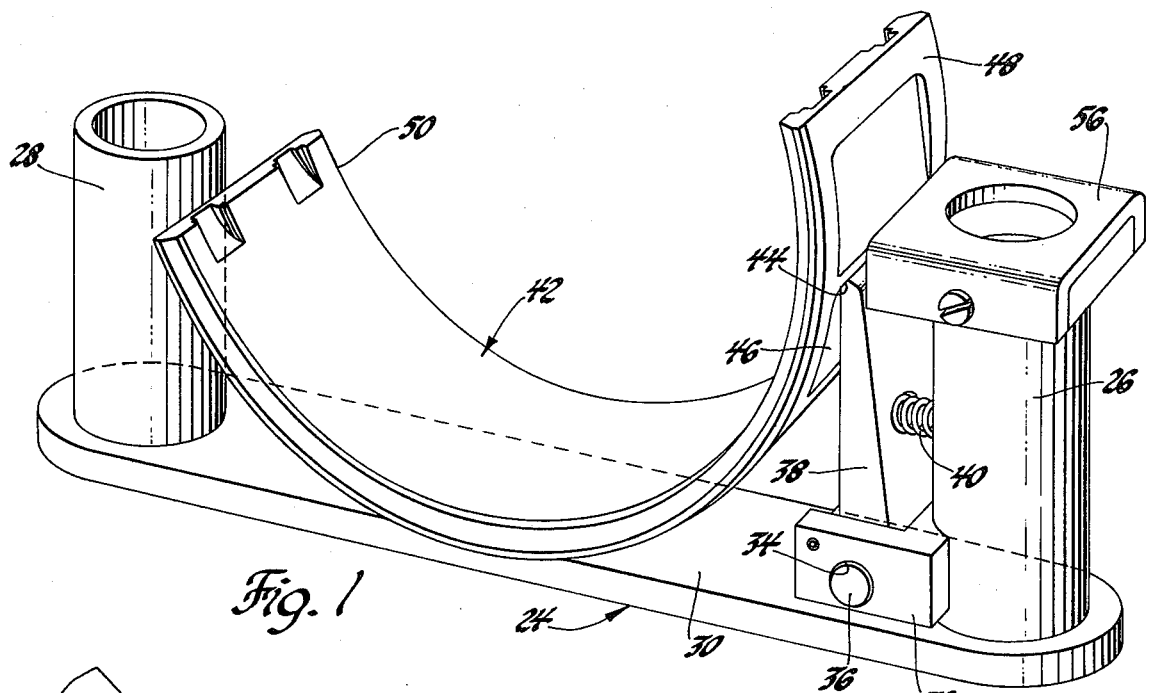
FIG. 1 shows a preferred embodiment of this invention.
Figure 3:
FIG. 3 is a view along line 3—3, less the shaft, bearing shell and arcuate member.

Referring to FIG. 1, one part of this invention is a reciprocable member, generally referred to as 24. Reciprocable member 24 comprises a pair of parallel tubes 26 and 28 welded or otherwise fastened to a crosspiece 30. The tubes 26 and 28 are large enough and spaced sufficiently apart that they will fit simultaneously over stud bolts 16 and 17, respectively, as shown in FIGS. 2 and 3.

A bracket 32 is welded to the crosspeice 30 and tube 26 at their intersection, the bracket 32 being provided with a pair of openings 34 which hold a pivot pin 36. The pivot pin 36 supports one end of a pawl 38 which is thus pivotally mounted in bracket 32. Pawl 38 extends generally parallel to tube 26 toward main bearing support 10 and upper main bearing shell 14, as shown in FIG. 2. Pawl 38 is biased away from tube 26 by a small compression spring 40 inserted therebetween.

The other portion of this invention is an arcuate ratchet member 42 which is similar in size and shape to a main bearing shell except for being radially thinner and having a circumferential row of ratchet teeth formed in its outer surface. As shown in FIG. 2, each of the ratchet teeth comprise a sharp downward step 44 in the outer surface followed by a long rising runner 46 back to the normal surface radius. The series of ratchet steps begins near one end 48 of ratchet member 42 and continues to a point near the other end 50.

When arcuate ratchet member 42 is placed against journal surface 20 of crankshaft 22 with end 48 abutting the end 52 of upper main bearing shell 14 nearest pawl 38, pawl 38 is forced by spring 40 against one of the rising runners 46 on the outer surface of ratchet member 42. Nut 18 on stud bolt 16 can be finger tightened, thus moving reciprocable member 24 toward main bearing support 10, until pawl 38 engages the sharp downward step 44 in ratchet member 42. From that point, as nut 18 is tightened with a wrench, riciprocable member 24, through pawl 38, forces end 48 of ratchet member 42 into bearing seat 12 and thus causes the opposite end 54 of upper main bearing shell 14 out of the other end of bearing seat 12. When a stop 56 on the free end of tube 26 meets main bearing support 10, the nut 18 and reciprocable member 24 are moved outward along stud bolt 16 away from main bearing support 10 until pawl 38 drops into the next sharp downward step 44. The sequence is then repeated until upper main bearing shell 14 is rotated completely out of bearing seat 12. At that time, of course, arcuate ratchet member 42 has been rotated into main bearing seat 12; but it is radially thinner than the main bearing shell it replaced and has not been frozen in by long hours of high forces and high heat. Therefore it can be pushed out easily with the aid of any convenient narrow instrument.

While tube 26 reciprocates on stud bolt 16, tube 28 similarly reciprocates on stud bolt 17. The main function of tube 28 is to act, through crosspiece 30, as a stabilizer to prevent reciprocable member 24 from being rotated about the axis of stud bolt 16 as nut 18 is being tightened with a wrench.

The device just described provides for safe and efficient removal of upper main bearing shells in combination with the stud bolts and nuts. A typical engine stud bolt thread, for example, provides for 57 pounds of force to be exerted on the upper main bearing shell for every foot pound of torque exerted by the wrench on the nut 18. The large reaction force generated is applied against the stud bolt 16 which is designed to handle very large loads, thus decreasing the chance of injury to the engine or the user of the device.

The embodiment described above is a preferred embodiment of this invention; and equivalent embodiments will undoubtedly occur to those skilled in the art. For this reason, the invention should be limited only by the claims which follow.

I claim:

1. A main bearing removal device for use with an engine having a block with one or more arcuate bearing seats, a crankshaft having journal surfaces adjacent the bearing seats, an arcuate bearing shell in each bearing seat between the bearing seat and the crankshaft journal surface, a pair of stud bolts flanking each bearing seat and projecting from the block and a nut on each stud bolt, the device comprising in combination:

a reciprocable member mountable on one of the stud bolts between the nut and the engine block, the reciprocable member having a pawl pivotably mounted thereon, the pawl extending toward the main bearing seat when the reciprocable member is mounted on the one stud bolt, and being biased away from the one stud bolt;

an arcuate member substantially similar to the main bearing shell, the arcuate member having ratchet teeth cut in its outer surface, the arcuate member being effective when placed against the crankshaft bearing surface with one end abutting the end of the main bearing shell nearest the pawl to engage the pawl with its ratchet teeth and push the main bearing shell out of the main bearing seat as the nut on the one stud bolt is screwed alternately down and back.

2. A main bearing removal device for use with an engine having one or more main bearing supports including arcuate bearing seats, a crankshaft having a journal surface adjacent each bearing seat, an arcuate bearing shell in each bearing seat between the bearing seat and the crankshaft journal surface, a pair of stud bolts flanking each bearing seat and projecting parallel to each other from the main bearing support and a nut on each stud bolt, the device comprising, in combination:

a reciprocable member comprising a pair of parallel tubes connected by a crosspiece, the tubes being spaced apart to fit over one of the pairs of stud bolts, the member further comprising bracket means near one of the tubes and a pawl mounted pivotably from the bracket means, the pawl extending toward the bearing seat when the tubes are placed on the stud bolts, the reciprocable member further comprising a compression spring retained between the pawl and the one tube to bias the pawl away from the one tube toward the other tube;

an arcuate member substantially similar to the main bearing shell in size and shape but radially thinner than the main bearing shell, the arcuate member having a series of ratchet teeth arranged circumferentially along its radially outer surface, each ratchet tooth comprising a sharp, radially inward drop and a long, smooth rising runner, the arcuate member being effective, when placed around the crankshaft journal surface with the end nearest the first radial drop adjacent the end of the main bearing shell nearest the pawl and the pawl engaging the ratchet teeth to act in cooperation with the reciprocable member to push the main bearing shell out of the bearing seat as the nut on the stud bolt nearest the pawl is screwed alternately down and back.

* * * * *